United States Patent
Jayaraman (10) Patent No.: US 11,900,050 B1
(45) Date of Patent: Feb. 13, 2024

(54) REMOTE GENERATION OF A DOCUMENT

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/181,611

(22) Filed: Mar. 10, 2023

(51) Int. Cl.
*G06F 40/186* (2020.01)
*G06F 40/174* (2020.01)
*G06F 3/12* (2006.01)

(52) U.S. Cl.
CPC .......... *G06F 40/174* (2020.01); *G06F 3/1222* (2013.01); *G06F 3/1271* (2013.01); *G06F 40/186* (2020.01)

(58) Field of Classification Search
CPC .... G06F 40/174; G06F 3/1222; G06F 3/1271; G06F 40/186
See application file for complete search history.

(56) References Cited

U.S. PATENT DOCUMENTS

| | | | |
|---|---|---|---|
| 2007/0028166 A1* | 2/2007 | Hundhausen | G06F 40/143 715/205 |
| 2018/0260378 A1* | 9/2018 | Theodore | G06F 16/93 |
| 2019/0163684 A1* | 5/2019 | Hurlbut | G06F 40/174 |
| 2019/0188301 A1* | 6/2019 | Nohutcuoglu | G06F 16/9535 |
| 2021/0350069 A1* | 11/2021 | Selinger | H04W 4/14 |
| 2023/0064655 A1* | 3/2023 | Selinger | H04L 51/02 |

* cited by examiner

*Primary Examiner* — Hassan Mrabi
(74) *Attorney, Agent, or Firm* — Michael A. Springs, Esq.; Shumaker, Loop & Kendrick, LLP; Patrick B. Horne (57) ABSTRACT

A computing system and a method remotely generate documents wherein a user establishes communication with the computing system from a user device and is instructed to enter the information in a document template displayed on the user device. The user device is enabled to select a document type and a document format. The document types include a conventional check and a cashier's check. The document formats include a printed hard copy and an electronic document.

20 Claims, 3 Drawing Sheets

REMOTE GENERATION OF A DOCUMENT

FIELD

This invention relates generally to the field of remote document generation, and more particularly embodiments of the invention relate to generating documents using an automated remote computing system executing a document generation method.

BACKGROUND

Many businesses provide online access to document templates to standardize the documents generated for various purposes. One such purpose is the generation and printing of conventional personal and business checks. Software, either online or a downloadable application, enables a user to enter required information and print a check on a check form. The check forms can be of the type typically provided to bank customers preprinted with the check number and information common to each check. Another type of check form is the blank laser check wherein the software application prints the entire check face including the magnetic ink character recognition (MICR) line.

Regular checks and cashier's checks are frequently used to purchase goods and services. Cashier's checks are popular as they have a reputation for being safe because they are guaranteed by the issuing bank. However, a person must call or visit the bank in order to have a cashier's check issued.

BRIEF SUMMARY

Embodiments of the present invention address the above needs and/or achieve other advantages by providing apparatuses and methods that enable a user to remotely and automatically verify whether a document is valid.

Embodiments of the invention include a computing system for remotely generating a document, the computing system comprising: a storage device storing a document template and an associated user instruction; a communication interface; a processor operatively coupled with the storage device and the communication interface, the processor adapted to be operatively coupled over a communication channel with a user device by the communication interface; and an application stored in the storage device and including executable code that, when executed causes the processor to: send a prompt to the user device causing the user device to display the template and the user instruction to the user; wherein the user responds to the user instruction by inputting into the displayed template information from the user device in coordination with a downloaded application stored on the user device, the information being required to generate the document, the user device then transmitting the information to the processor via the communication channel; receive the information from the user device and confirm whether the document can be generated as a valid document; and when the document can be generated as a valid document, enable the user device via the communication channel to generate the document as an issued document.

The user selects one of at least two types of the document to be generated using the user device and the computing system responds by sending the prompt and the user instruction to the user device. The types of document include a cashier's check and a conventional check.

When the document can be generated as a valid document, the computing system enables the user to select one of at least two document formats using the user device. The document formats include a printed hard copy of the document and an electronic document.

The computing system enables the user device to actuate an associated printer to print the hard copy or is enabled to store the electronic document. The valid document can be a form of financial settlement.

The computing system storage device stores data associated with the document and the processor updates the stored data when the valid document is issued.

Another embodiment of the invention is a method of remotely generating a document, the method comprising steps of: displaying, by a user-interface of a user device, a prompt, wherein the prompt provides a document template and a user instruction regarding initiating a generation of a document; responding to the user instruction by entering information into designated spaces in the document template in cooperation with a downloaded application stored on the user device, wherein the downloaded application comprises computer-executable code that, when executed by a processor of the user device, provides the user-interface and responds to the entered information to generate document information; transmitting the document information to a computing system by operation of the user-interface and a communication circuitry of the user device; receiving the document information by the computing system, the computing system confirming whether the document can be generated as a valid document using the document information; and the computing system enabling the user device to generate the document as a valid document.

The method includes displaying by the user-interface at least two document types for selection by a user of the user device. The document types include a conventional check and a cashier's check. The method includes transmitting a document type selection from the user device to the computing system and wherein the template corresponds to the document type.

The method includes displaying by the user-interface at least two document formats for selection by the user of the user device. The document formats include a hard copy print document and an electronic document. The method includes transmitting a hard copy print document format selection from the user device to the computing system and the computing system responding by enabling the user device to print the document. The method includes transmitting an electronic document selection from the user device to the computing system and the computing system downloading the document as an electronic document to the user device.

The method includes updating data in a storage device to indicate that the document has issued as a valid document.

The valid document can be a form of financial settlement. The entered information can include a valid by date to be included on the document. The method includes enabling a user of the user device to cancel the valid document that is an issued cashier's check.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
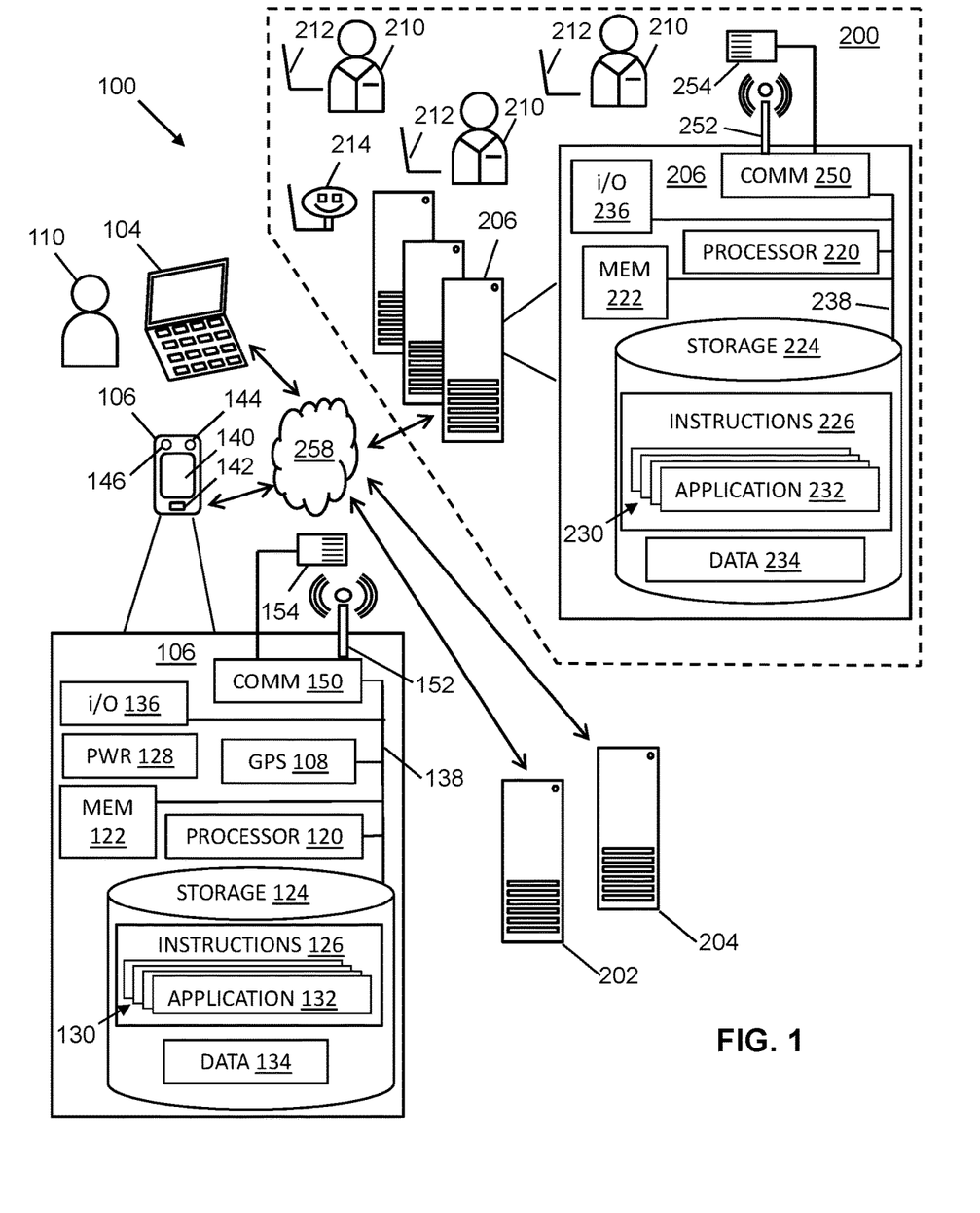
FIG. 1 illustrates an enterprise system, and environment thereof, according to at least one embodiment.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

There are circumstances wherein a person or a business desires to generate an original document that otherwise would be obtained from an entity that issues such documents. For example, a bank provides checks associated with a customer's account. These are conventional checks that are associated with a personal account or a business account and typically are sent to the customer by an authorized check printer. Printer ready check forms can be used with software application by a customer to print completed checks. However, to obtain a cashier's check the customer must telephone or visit the bank to have the bank generate the document. Embodiments of the present invention enable an automated remote generation of documents such as conventional checks and cashier's checks.

Figure 2:
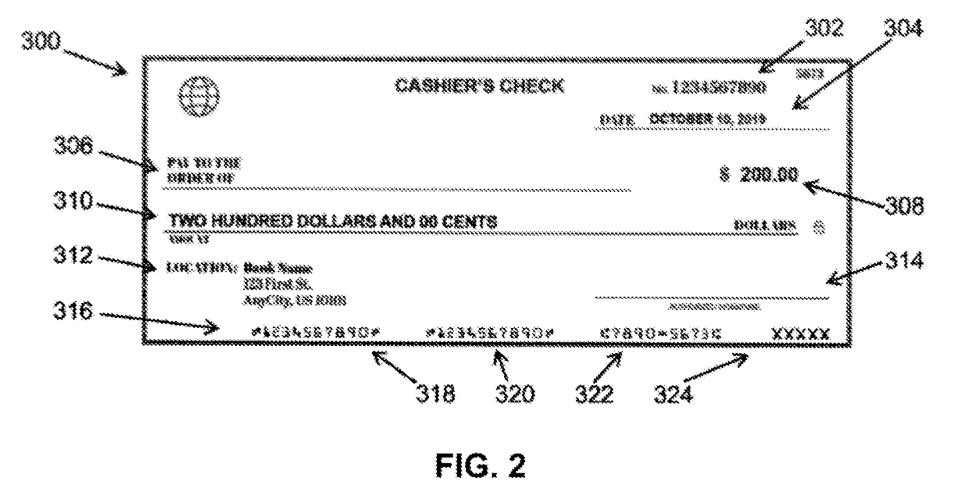
FIG. 2 is a view of a document template according to at least one embodiment of the invention.

FIG. 2 is a front side view of a template for a typical cashier's check 300 according to the invention. A template for a conventional personal or business check has a similar format without the "CASHIER'S CHECK" title. Information to be included on the check generated from the template 300 includes a check number 302 that is one of consecutive numbers for a conventional check and is a number assigned by the bank for a cashier's check. The information further includes: a date line 304 (date issued or "valid by" date); a payee line 306; an amount line 308 for the amount in numerals; an amount line 310 for the corresponding amount in text; a payer identification 312; an authorized signature line 314; and a magnetic ink character recognition (MICR)

line 316. The MICR line 316 includes a bank routing number 318, a payer account number 320 and a check number 322 related to the check number 302. As shown in FIG. 2, the document template 300 has designed spaces for entering the information.

As an additional feature, the template 300 has a unique document verification code 324 added on the front side by the bank. Although the verification code 324 can be positioned in any available space on the front side, an advantageous location is at the right end of the MICR line 316. If the verification code 324 is a number, e.g. a five digit number, it can be printed in the same font as the other numbers in the line 316. Other types of verification codes include an alphanumeric phrase, a bar code, a QR code, and a holographic image. Thus, the verification code 324 can be any one or combination of the types described above, or any format that encodes information enabling verification of the cashier's check generated from the template 300.

As discussed below in connection with FIG. 3, the completed document template 300 can be used to generate a document in a form similar to the template as shown in FIG. 2, or can used to generate an encrypted document 400 displaying the above-identified information as an information code in any suitable format. The document 400 includes a coded information area 402, a readable information area 404 and the MICR line 316 shown in FIG. 2. The coded information in the area 402 can include all or as much of the information shown in the document template 300 of FIG. 2 as desired. The readable information in the area 404 can be as simple as a check number, or include information shown in the document template 300 and not included in the area 402, or a legal notice, or bank contact information, etc. The readable information area 404 and the MICR line 316 are optional since that information can be included in the coded information displayed in the area 402.

There are various formats that can be used to display the information in the area 402. A common format is the Code 39 barcode that is a lineal, 1D, alphanumeric code with the ability to include the entire 128 ASCII character set and extend to any length. Another common format is the QR code that is a matrix of black squares arranged in a square grid on a white background including some fiducial markers. Another format is a holographic image. Any suitable format can be used.

The document being generated can be issued in various formats. For example, a hard copy can be printed. The hard copy of a check as shown in FIG. 2 or FIG. 3 can be used for financial transactions in the same manner as a check issued by a financial institution. Another format is an electronic document that can be stored by a user device and transmitted by email, text, etc. Electronic documents include e-checks, Portable Document Format (PDF) files and image files (e.g. JPG, PNG and TIF).

Figure 3:
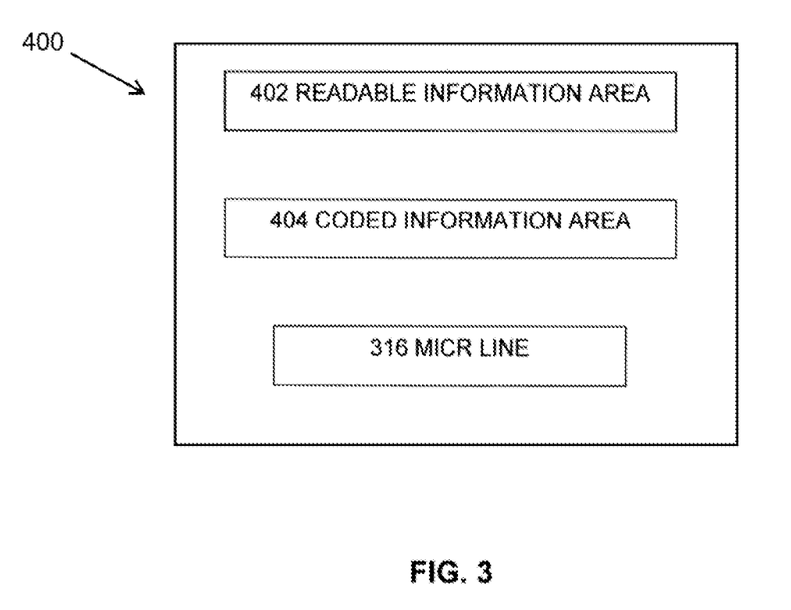
FIG. 3 is a view of an encrypted document generated from the document template of FIG. 2.
Figure 4:
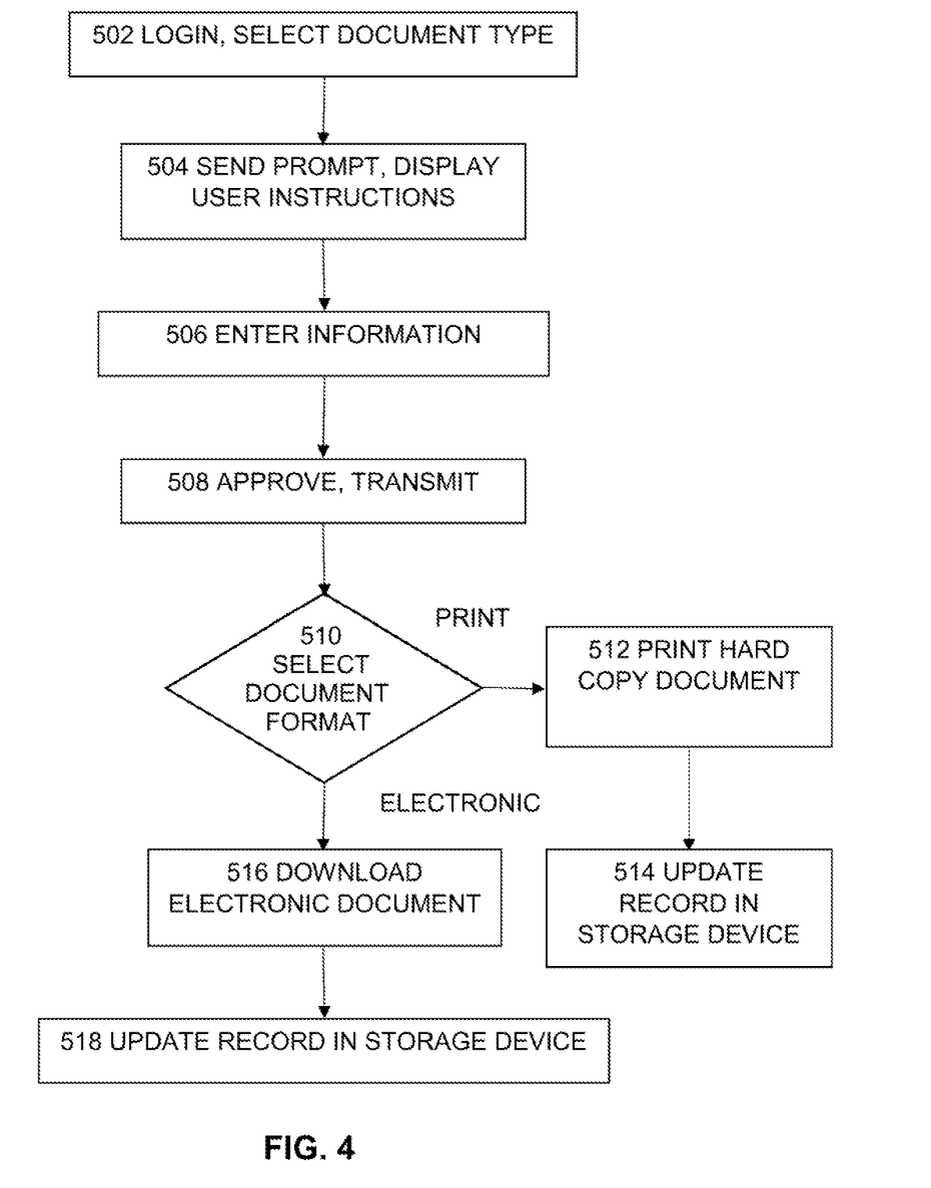
FIG. 4 is a flow diagram representing a method, according to at least one embodiment, of generating documents according to an embodiment of the invention.

FIG. 4 is a flow diagram representing a method 500, according to at least one embodiment of the invention, of remotely generating a document such as the document 300 of FIG. 2 and the document 400 of FIG. 3. The method 500 begins with a step 502 where the user 110 logs into the computing system 206 from a user device (104, 106). If more than one document type is available, the user also makes a document type selection. The system 206 sends a prompt to the user device (104, 106) in a step 504 causing the user device to display a user instruction regarding initiating the generation of a document by the user. The user responds to the user instruction in a step 506 by entering the required information into a displayed document template (e.g. the template 300 in FIG. 2) in coordination with a downloaded application 132 stored on the user device. The user approves the entered information that is displayed in a step 508 and the approved information is transmitted by the user device to the processing device 220 of the computing system 206 via the communication channel 258. The step 506 also includes displaying further instructions when required to prompt the user to provide missing information or correct errors. The computing system 206 processes the received information to confirm whether the document can be generated as a valid document such as a valid form of settlement of a financial transaction.

In a step 510, the user selects the format of the document to be issued. The user can select PRINT to generate a hard copy of the document such as the document types shown in FIG. 2 and FIG. 3. In response to the PRINT selection, the user device communicates with an associated printer to produce the hard copy in a step 512. In a step 514, the computing system 206 updates the stored record of the issued document.

In the step 510, the user can select the ELECTRONIC format. The computing system 206 then downloads the issued electronic document to the user device in a step 516. In a step 518, the computing system 206 updates the stored record of the issued document.

The above described computing system and method according to the invention provide an automated remote generation of a document, such as a cashier's check, at any time convenient to the user. The computing system and method also can provide options such as placing a "valid by" date on the document and enabling the user to cancel an issued cashier's check. The user can be presented with options as to the type of document to be generated and the format of the issued document.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computing system for remotely generating a document, the computing system comprising:
    a storage device storing a document template and an associated user instruction;
    a communication interface;
    a processor operatively coupled with the storage device and the communication interface, the processor adapted to be operatively coupled over a communication channel with a user device by the communication interface; and
    an application stored in the storage device and including executable code that, when executed causes the processor to:
    send a prompt to the user device causing the user device to display the template and the user instruction to the user;
    wherein the user responds to the user instruction by inputting into the displayed template information from the user device in coordination with a downloaded application stored on the user device, the information being required to generate the document, the user device then transmitting the information to the processor via the communication channel;
    receive the information from the user device and confirm whether the document can be generated as a valid document; and when the document can be generated as a valid document, enable the user device via the communication channel to generate the document as an issued document.

2. The computing system according to claim 1 wherein the user selects one of at least two types of the document to be generated using the user device and the computing system responds by sending the prompt and the user instruction to the user device.

3. The computing system according to claim 2 wherein the types of document include a cashier's check and a conventional check.

4. The computing system according to claim 1 wherein when the document can be generated as a valid document, the computing system enables the user to select one of at least two document formats using the user device.

5. The computing system according to claim 4 wherein the document formats include a printed hard copy of the document and an electronic document.

6. The computing system according to claim 5 wherein the user device is enabled to actuate an associated printer to print the hard copy or is enabled to store the electronic document.

7. The computing system according to claim 1 wherein the valid document is a form of financial settlement.

8. The computing system according to claim 1 wherein the storage device stores data associated with the document and the processor updates the stored data when the valid document is issued.

9. A method of remotely generating a document, the method comprising steps of:
- displaying, by a user-interface of a user device, a prompt, wherein the prompt provides a document template and a user instruction regarding initiating a generation of a document;
- responding to the user instruction by entering information into designated spaces in the document template in cooperation with a downloaded application stored on the user device, wherein the downloaded application comprises computer-executable code that, when executed by a processor of the user device, provides the user-interface and responds to the entered information to generate document information;
- transmitting the document information to a computing system by operation of the user-interface and a communication circuitry of the user device;
- receiving the document information by the computing system, the computing system confirming whether the document can be generated as a valid document using the document information; and
- the computing system enabling the user device to generate the document as a valid document.

10. The method according to claim 9 including displaying by the user-interface at least two document types for selection by a user of the user device.

11. The method according to claim 10 wherein the document types include a conventional check and a cashier's check.

12. The method according to claim 10 including transmitting a document type selection from the user device to the computing system and wherein the template corresponds to the document type.

13. The method according to claim 10 including displaying by the user-interface at least two document formats for selection by the user of the user device.

14. The method according to claim 13 wherein the document formats include a hard copy print document and an electronic document.

15. The method according to claim 14 including transmitting a hard copy print document format selection from the user device to the computing system and the computing system responding by enabling the user device to print the document.

16. The method according to claim 14 including transmitting an electronic document selection from the user device to the computing system and the computing system downloading the document as an electronic document to the user device.

17. The method according to claim 10 including updating data in a storage device to indicate that the document has issued as a valid document.

18. The method according to claim 10 wherein the valid document is a form of financial settlement.

19. The method according to claim 10 wherein the entered information includes a valid by date to be included on the document.

20. The method according to claim 10 including enabling a user of the user device to cancel the valid document that is an issued cashier's check.

* * * * *